United States Patent [19]

Chen et al.

[11] Patent Number: 6,005,021

[45] Date of Patent: Dec. 21, 1999

[54] NO-BAKE FOUNDRY MIXES AND THEIR USES

[75] Inventors: Chia-hung Chen, Dublin; Thomas E. Dando, Sunbury, both of Ohio

[73] Assignee: Ashland Inc., Russell, Ky.

[21] Appl. No.: 09/196,976

[22] Filed: Nov. 20, 1998

Related U.S. Application Data

[62] Division of application No. 08/874,621, Jun. 13, 1997, Pat. No. 5,859,091.

[51] Int. Cl.$^6$ ........................................... B22C 1/22
[52] U.S. Cl. ........................... 523/139; 523/142; 524/590
[58] Field of Search ..................... 523/142, 139; 524/590

[56] References Cited

U.S. PATENT DOCUMENTS

| | | | |
|---|---|---|---|
| 4,125,691 | 11/1978 | White | 521/51 |
| 4,148,777 | 4/1979 | LeBar et al. | 523/143 |
| 4,268,425 | 5/1981 | Gardikes | 524/594 |
| 4,287,930 | 9/1981 | McIntosh et al. | 152/526 |
| 4,358,570 | 11/1982 | Tobinaga | 525/456 |
| 5,130,404 | 7/1992 | Freeland | 528/52 |
| 5,132,339 | 7/1992 | Carpenter et al. | 524/595 |
| 5,455,287 | 10/1995 | Carpenter et al. | 524/595 |
| 5,482,777 | 1/1996 | Yamakawa et al. | 428/425.9 |
| 5,668,211 | 9/1997 | Dormish | 524/590 |
| 5,688,857 | 11/1997 | Chen et al. | 524/590 |

OTHER PUBLICATIONS

Ash, Handbook of Plastic and Rubber Additives, pp. 797–798, p. 432, 1995.

*Primary Examiner*—David W. Wu
*Assistant Examiner*—Ling Sui Choi
*Attorney, Agent, or Firm*—David L. Hedden

[57] ABSTRACT

This invention relates to polyurethane-forming foundry binder systems and foundry mixes which comprise a foundry aggregate, said foundry binder system, and a liquid amine curing catalyst. The binder system comprises a polyol component containing a polyether polyol and a monomeric glycol, and an organic polyisocyanate component. The foundry mixes are used to prepare foundry shapes made from foundry mixes by a no-bake process.

14 Claims, No Drawings

ND BAKE FOUNDRY MIXES AND THEIR USES

This application is a division of application Ser. No. 08/874,621, filed Jun. 13, 1997, now U.S. Pat. No. 5,859,091.

FIELD OF THE INVENTION

This invention relates to polyurethane-forming foundry binder systems and foundry mixes which comprise a foundry aggregate, said foundry binder system, and a liquid amine curing catalyst. The binder system comprises a polyol component containing a polyether polyol and a monomeric polyol, and an organic polyisocyanate component. The foundry mixes are used to prepare foundry shapes made from foundry mixes by a no-bake process.

BACKGROUND OF THE INVENTION

In the foundry industry, one of the processes used for making metal parts is sand casting. In sand casting, disposable foundry shapes (usually characterized as molds and cores) are made by shaping and curing a foundry mix which is a mixture of sand and an organic or inorganic binder.

One of the processes used in sand casting for making molds and cores is the no-bake process. In this process, a foundry aggregate, binder, and liquid curing catalyst are mixed and compacted to produce a cured mold and/or core. In the no-bake process, it is important to formulate a foundry mix which will provide sufficient worktime to allow shaping. Worktime is the time between when mixing begins and when the mixture can no longer be effectively shaped to fill a mold or core.

A binder commonly used in the no-bake process is a polyurethane binder derived by curing a polyurethane-forming binder with a liquid tertiary amine catalyst. Such polyurethane-forming binders used in the no-bake process, have proven satisfactory for casting such metals as iron or steel which are normally cast at temperatures exceeding about 1370° C. They are also useful in the casting of light-weight metals, such as aluminum, which have melting points of less than 815° C.

The polyurethane-forming binder usually consists of a phenolic resin component and polyisocyanate component which are mixed with sand prior to compacting and curing. Both the phenolic resin component and polyisocyanate component generally contain a substantial amount of organic solvent which can be obnoxious to smell and can create stress for the environment such as smoke when the binder is cured. Because of this, there is an interest in developing binders which do not require the use of organic solvents.

U.S. Pat. No. 5,455,287 discloses no-bake foundry mixes where the binder comprises (a) polyether polyol having a hydroxyl number between 200–600 and a viscosity of 100–1000 centipoise at 25° C., (b) an organic polyisocyanate component, and (c) a liquid tertiary amine catalyst, preferably a bicyclic tertiary amine.

SUMMARY OF THE INVENTION

This invention relates to a foundry mix comprising as a mixture:

(1) a foundry aggregate;
(2) a polyurethane binder comprising:
  (a) a polyol component comprising:
    (i) a polyether polyol; and
    (ii) a monomeric polyol; and
  (b) an organic polyisocyanate component;
  (c) a catalytically effective amount of a liquid tertiary amine catalyst, wherein components (a) and (b) are compatible with each other.

The invention also relates foundry binder systems used in the foundry mixes and to the use of these foundry mixes in a no-bake process for preparing foundry shapes. Additionally, the invention also relates to the use of these foundry shapes to cast metal parts.

The foundry binder has a lower viscosity than those utilized in U.S. Pat. No. 5,455,287 which allows for easier pumping (even in the winter) and mixing of the sand and binder, and improves the bonding between the sand and the binder. Comparison experiments show that immediate, 1 hour, and 3 hour tensiles strengths are improved by combining the polyether polyol and the monomeric polyol.

The binders of the foundry mixes are most preferably free of free formaldehyde and free phenol. However, they may small amounts of free formaldehyde, i.e. no more than 2 weight percent free formaldehyde, preferably no more than 1 percent, and no more than 2 weight percent free phenol, preferably no more than 1 percent. Preferably, the binders do not contain solvents and thus are low in odor when mixing with sand, and do not produce much smoke during pour off which creates less stress to the environment than conventional polyurethane-forming binders. The sand shakes out from the castings effectively and the surface finish of the casting is good.

BEST MODE AND OTHER MODES

The polyether polyols which are used in the polyurethane-forming foundry binders are liquid polyether polyols or blends of liquid polyether polyols having a hydroxyl number of from about 200 to about 600, preferably about 300 to about 500 milligrams of KOH based upon one gram of polyether polyol. The viscosity of the polyether polyol is from 100 to 1,000 centipoise, preferably from 200 to 700 centipoise, most preferably 300 to 500 centipoise. The polyether polyols may have primary and/or secondary hydroxyl groups.

These polyols are commercially available and their method of preparation and determining their hydroxyl value is well known. The polyether polyols are prepared by reacting an alkylene oxide with a polyhydric alcohol in the presence of an appropriate catalyst such as sodium methoxide according to methods well known in the art. Any suitable alkylene oxide or mixtures of alkylene oxides may be reacted with the polyhydric alcohol to prepare the polyether polyols. The alkylene oxides used to prepare the polyether polyols typically have from two to six carbon atoms. Representative examples include ethylene oxide, propylene oxide, butylene oxide, amylene oxide, styrene oxide, or mixtures thereof. The polyhydric alcohols typically used to prepare the polyether polyols generally have a functionality greater than 2.0, preferably from 2.5 to 5.0, most preferably from 2.5 to 4.5. Examples include ethylene glycol, diethylene glycol, propylene glycol, trimethylol propane, and glycerine.

The monomeric polyols used in the polyol component have an average functionality of 2 to 4, hydroxyl numbers from 500 to 2000, more preferably from 700 to 1200, and viscosities less than 200 centipoise at 25° C., preferably less than 100 centipoise at 25° C. Examples of such monomeric polyols include ethylene glycol, diethylene glycol, triethylene glycol, 1,3-propane diol, 1,4-butanediol, 1,2,4-butanetriol, dipropylene glycol, tripropylene glycol, glycerin, tetraethylene glycol, and mixtures thereof.

The weight ratio of the polyether polyol to the monomeric polyol in the polyol component is from 70:30 to 30:70, preferably from 60:40 to 40:60.

Although not preferred, minor amounts of phenolic resin and/or amine-based polyols can be added to the polyether polyol. By minor amounts, it is meant that less than 15 weight percent, preferably less than 5 weight percent, said weight percent based upon the weight of the polyether polyol component. If a phenolic resin is added to the polyether polyol, the preferred phenolic resins used are benzylic ether phenolic resins which are specifically described in U.S. Pat. No. 3,485,797 which is hereby incorporated by reference into this disclosure.

Although not preferred, organic solvents may be added to the polyol component, particularly if a benzylic ether phenolic resin is used. The amount of solvent used is generally less than 15 weight percent based upon the total weight of the polyol component, preferably less that 5 weight percent.

Other optional ingredients which may be added to the polyether include release agents and adhesion promoters, such as silanes described in U.S. Pat. No. 4,540,724 which is hereby incorporated into this disclosure by reference, to improve humidity resistance.

Organic polyisocyanates used in the organic polyisocyanate component are liquid polyisocyanates having a functionality of two or more, preferably 2 to 5. They may be aliphatic, cycloaliphatic, aromatic, or a hybrid polyisocyanate. Mixtures of such polyisocyanates may be used. The polyisocyanates should have a viscosity of about 100 to about 1,000, preferably about 200 to about 600.

Representative examples of polyisocyanates which can be used are aliphatic polyisocyanates such as hexamethylene diisocyanate, alicyclic polyisocyanates such as 4,4'-dicyclohexylmethane diisocyanate, and aromatic polyisocyanates such as 2,4- and 2,6-toluene diisocyanate, diphenylmethane diisocyanate, and dimethyl derivates thereof. Other examples of suitable polyisocyanates are 1,5-naphthalene diisocyanate, triphenylmethane triisocyanate, xylylene diisocyanate, and the methyl derivates thereof, polymethylenepolyphenyl isocyanates, chlorophenylene-2,4-diisocyanate, and the like.

The polyisocyanates are used in sufficient concentrations to react with the polyether polyol and cure in the presence of the liquid amine curing catalyst. In general the isocyanate ratio of the polyisocyanate to the hydroxyl of the polyol component (NCO/OH ratio), is from 1.25:1.0 to 0.60:1.0, preferably about 0.9:1.0 to 1.1:1.0, and most preferably about 1.0:1:0.

The polyisocyanate component may contains a natural oil Representative examples of natural oils which are used in the isocyanate component are linseed oil including refined linseed oil, epoxidized linseed oil, alkali refined linseed oil, soybean oil, cottonseed oil, RBD Canola oil, refined sunflower oil, tung oil, and dehydrated castor oil.

Optional ingredients such as release agents and solvents may also be used in the organic polyisocyanate component.

Although not preferred, solvents may be used in the organic polyisocyanate component and/or polyol component. If solvents are used in either, those skilled in the art will know how to select them. Typical organic solvents which are used include aromatic solvents, esters, or ethers, preferably mixtures of these solvents. Preferably, these solvents are used in amounts less than about preferably less than 15 weight percent based upon the weight of the isocyanate component, more preferably less that 5 weight percent.

The binder is preferably made available as a three package system with the polyol component in one package, the organic polyisocyanate component in the second package, and the catalyst in the third package. When making foundry mixes, usually the binder components are combined and then mixed with sand or a similar aggregate to form the foundry mix or the mix can be formed by sequentially mixing the components with the aggregate. Preferably the polyether polyol and catalyst are first mixed with the sand before mixing the isocyanate component with the sand. Methods of distributing the binder on the aggregate particles are well-known to those skilled in the art. The mix can, optionally, contain other ingredients such as iron oxide, ground flax fibers, wood cereals, pitch, refractory flours, and the like.

The liquid amine catalyst is a base having a $pK_b$ value generally in the range of about 7 to about 11. The term "liquid amine" is meant to include amines which are liquid at ambient temperature or those in solid form which are dissolved in appropriate solvents. The $pK_b$ value is the negative logarithm of the dissociation constant of the base and is a well-known measure of the basicity of a basic material. The higher this number is, the weaker the base. The bases falling within this range are generally organic compounds containing one or more nitrogen atoms.

Specific examples of bases which have $pK_b$ values within the necessary range include 4-alkyl pyridines wherein the alkyl group has from one to four carbon atoms, isoquinoline, arylpyridines such as phenyl pyridine, pyridine, acridine, 2-methoxypyridine, pyridazine, 3-chloro pyridine, quinoline, N-methyl imidazole, N-ethyl imidazole, 4,4'-dipyridine, 4-phenylpropylpyridine, 1-methylbenzimidazole, and 1,4-thiazine. Preferably used as the liquid tertiary amine catalyst is an aliphatic tertiary amine, particularly POLYCAT 9 [tris(3-dimethylamino) propylamine)] catalyst sold by Air Products.

In view of the varying catalytic activity and varying catalytic effect desired, catalyst concentrations will vary widely. In general, the lower the $pK_b$ value is, the shorter will be the worktime of the composition and the faster, more complete will be the cure. In general, catalyst concentrations will be a catalytically effective amount which generally will range from about 0.2 to about 5.0 percent by weight of the polyether polyol, preferably 1.0 percent by weight to 4.0 percent by weight, most preferably 2.0 percent by weight to 3.5 percent by weight based upon the weight of the polyether polyol.

In a preferred embodiment of the invention, the catalyst level is adjusted to provide a worktime for the foundry mix of 3 minutes to 10 minutes, preferably 8 minutes to about 10 minutes, and a striptime of about 4 minutes to 12 minutes, preferably 9 minutes to about 10 minutes. Worktime is defined as the time interval after mixing the polyisocyanate, polyether, and catalyst and the time when the foundry shape reaches a level of 60 on the Green Hardness "B" Scale Gauge sold by Harry W. Dietert Co., Detroit, Mich. Striptime is time interval after mixing the polyisocyanate, polyether, and catalyst and the time when the foundry shape reaches a level of 90 on the Green Hardness "B" Scale Gauge.

In this preferred embodiment, the ratio of the isocyanate groups of the polyisocyanate to hydroxyl groups of the polyol is preferably about 0.9:1.0 to about 1.1:1.0, most preferably about 1.0:1:0, the hydroxyl number of the polyol is from about 200 to about 500, and the weight ratio of polyisocyanate to polyether polyol is from about 65:35 to about 35:65, preferably about 45:55. These parameters provide optimum worktime, striptime, and tensile properties.

Various types of aggregate and amounts of binder are used to prepare foundry mixes by methods well known in the art. Ordinary shapes, shapes for precision casting, and refractory shapes can be prepared by using the binder systems and proper aggregate. The amount of binder and the type of aggregate used is known to those skilled in the art. The preferred aggregate employed for preparing foundry mixes is sand wherein at least about 70 weight percent, and preferably at least about 85 weight percent, of the sand is silica. Other suitable aggregate materials for ordinary foundry shapes include zircon, olivine, aluminosilicate, chromite sand, and the like.

In ordinary sand type foundry applications, the amount of binder is generally no greater than about 10% by weight and frequently within the range of about 0.5% to about 7% by weight based upon the weight of the aggregate. Most often, the binder content for ordinary sand foundry shapes ranges from about 0.6% to about 5% by weight based upon the weight of the aggregate in ordinary sand-type foundry shapes.

The aggregate employed with the catalyzed binder in producing the foundry mix should be sufficiently dry so that a handleable foundry shape results after a worktime of 3 to 10 minutes and a strip time of 4 to 12 minutes. Generally the amounts of moisture in the aggregate is less than about 0.5 per cent by weight, preferably less than about 0.2 percent by weight, and most preferably less than about 0.1 percent by weight based on the weight of the sand.

EXAMPLES

The examples which follow will illustrate specific embodiments of the invention. These examples along with the written description will enable one skilled in the art to practice the invention. It is contemplated that many other embodiments of the invention will be operable besides those specifically disclosed.

In all of the examples, the test specimens, unless otherwise indicated, were produced by the no-bake process using 3.5 weight percent, based on the Part I, of POLYCAT 9 catalyst sold by Air Products which is 12.5 weight percent tris(3-dimethylamino)propylamine in dipropylene glycol. All parts are by weight and all temperatures are in °C. unless otherwise specified.

Unless otherwise indicated, the foundry mixes were prepared by first mixing 4000 parts WEDRON 540 sand with the polyol component and the catalyst for about 2 minutes. Then the MONDUR MR was mixed with the mixture of sand, polyol component, and catalyst for about 2 minutes. The composition of the polyol component and the binder level, where appropriate, is specified in Tables I and II. The amount of polyol component and polyisocyanate was such that the ratio of hydroxyl groups of the polyol component to isocyanato groups of the polyisocyanate was about 1:1 and the weight ratio of polyol to polyisocyanate was about 41:59.

Measuring the tensile strength of the dog bone shapes enables one to predict how the mixture of sand and binder will work in actual foundry operations. The foundry shapes were stored 0.5 hour, 1 hour, 3 hours and 24 hours in a constant temperature room at a relative humidity of 50% and a temperature of 25° C. before measuring their tensile strengths. Unless otherwise specified, the tensile strengths were also measured on shapes stored 24 hours at a relative humidity (RH) of 100%.

The following terms were used in the examples:

| | |
|---|---|
| BOS | = based on sand. |
| DEG | = diethylene glycol having OH # of 1058, functionality of 2 and viscosity of 28 cps. |
| DPG | = dipropylene glycol. |
| MONDUR MR | = an organic polyisocyanate commercially available from BAYER AG having a functionality of 2.5 to 2.7. |
| PEP PLURACOL POLYOL | = polyether polyol. |
| TP-440 | = a polyether polyol, sold commercially by BASF, having an OH value of 398, prepared by reacting propylene oxide with trimethylol propane. |
| RH | = relative humidity. |
| ST | = striptime. |
| TEG | = triethylene glycol having an OH # of 748, a functionality 2, and a viscosity of 35 cps. |
| VIS | = viscosity. |
| WT | = worktime. |

Control A and B and Example 1

Control A is based upon the teachings of U.S. Pat. No. 5,455,287 and does not contain a glycol while Control B uses a glycol, trethylene glycol, but does not use a polyether polyol. Table I shows the results of Control A and B compared to the formulations of Example 1 where a mixture of a polyether polyol and were used as the polyol component at a binder level of 1.3 weight percent based upon the weight of the sand.

TABLE I

| | TENSILE PROPERTIES OF CORES | | | | | | |
|---|---|---|---|---|---|---|---|
| | | | VIS | | TENSILE (PSI) | | |
| EXAMPLE | PEP | TEG | (cps) | WT/ST | 30' | 1 HR | 3 HR |
| Control A | 100 | 0 | 632 | 13.25/23.00 | 100 | 254 | 302 |
| Control B | 0 | 100 | 35 | 6.25/11.50 | 15 | 27 | 45 |
| 1 | 50 | 50 | 100 | 4.25/7.50 | 257 | 322 | 353 |

The data in Table I indicate that the foundry binder binders containing the mixture of polyether polyol and glycol have lower viscosities and improved tensile strengths even though they are solventless. This result is surprising in view of the low tensile strengths that result when triethylene glycol is used alone. Such binders are clearly more environmentally friendly and create less odor and smoke.

Example 2

Example 2 was essentially repeated except diethylene glycol was used as the glycol instead of triethylene glycol. The binder consisted of polyether polyol TP-440 and diethylene glycol at 60/40 blend. Table II shows this binder performed well in sand tensile strength development too.

TABLE II

TENSILE PROPERTIES OF CORES

| EXAMPLE | PEP | DEG | VIS (cps) | WT/ST | TENSILE (PSI) 30' | 1 HR | 3 HR |
|---|---|---|---|---|---|---|---|
| 2 | 60 | 40 | 83 | 3.3/5.8 | 105 | 152 | 176 |

Examples 3–5

Examples 3–5 show the effect of changing the binder level in the formulations containing the polyether polyol and the glycol. In these examples, triethylene glycol was used as a 50/50 blend with the polyether polyol. Table III shows that reducing binder levels from 1.5 to 1.0% resulted in minor decreases of the sand tensile strengths as well as an increase of the WT/ST).

TABLE III

TENSILE PROPERTIES OF CORES AT VARYING BINDER LEVELS

| EXAMPLE | BINDER LEVEL | VIS (cps) | WT/ST | TENSILE (PSI) 30 | 1 HR | 3 HR | 24 HR | 24 HR 100% RH |
|---|---|---|---|---|---|---|---|---|
| 3 | 1.5 | 100 | 3.5/5.5 | 282 | 278 | 321 | 317 | 40 |
| 4 | 1.25 | 100 | 4.3/7.5 | 224 | 270 | 318 | 307 | 41 |
| 5 | 1.0 | 100 | 5.5/10.2 | 148 | 207 | 225 | 287 | 40 |

The data in Examples 3–5 indicate that worktime/striptime increases with decreasing binder level and the tensile strengths of the test specimens increase with increasing binder level.

We claim:

1. A no-bake foundry mix comprising in admixture:
   a foundry aggregate:
   a binder comprising:
   (1) a polyol component comprising
      (a) a polyether polyol; and
      (b) a monomeric polyol having a hydroxyl number of 700 to 1,200;
   (2) an organic polyisocyanate component, wherein the weight ratio of polyether polyol to monomeric polyol in the polyol component is from 70:30 to 30:70 and the polyol component contains less than 15 weight percent of phenolic resin; and
   C. a catalytically effective amount of a liquid tertiary amine catalyst.

2. The foundry mix of claim 1 wherein the monomeric monomeric polyol has a hydroxyl functionality of from about 2.0 to about 4.0, and a viscosity of less than 100 centipoise at 25° C.

3. The foundry mix of claim 2 wherein the monomeric polyol is selected from the group consisting of ethylene glycol, diethylene glycol, triethylene glycol, 1,3-propane diol, 1,4-butanediol, 1,2,4-butane triol, dipropylene glycol, tripropylene glycol, and mixtures thereof.

4. The foundry mix of claim 3 wherein the tertiary amine catalyst is an aliphatic tertiary amine.

5. The foundry mix of claim 4 wherein the amount of moisture in the aggregate is less than about 0.1 weight percent based upon the total weight of the aggregate.

6. The foundry mix of claim 5 wherein the tertiary amine catalyst is tris(3-dimethylamino)propylamine.

7. A process for casting a low melting metal which comprises:
   A. fabricating a foundry shape by the no-bake process wherein said shape is prepared with a foundry mix of claim 1;
   B. pouring said low melting metal while in the liquid state into and around said shape;
   C. allowing said low melting metal to cool and solidify; and
   D. then separating the molded article.

8. A metal casting prepared in accordance with claim 7.

9. A no-bake foundry binder system comprising as separate components:
   A. a polyol component comprising
      (a) a polyether polyol; and
      (b) a monomeric polyol having a hydroxyl number of 700 to 1,200;
   B. an organic polyisocyanate component, wherein the weight ratio of polyether polyol to monomeric polyol in the polyol component is from 70:30 to 30:70 and the polyol component contains less than 15 weight percent of phenolic resin; and
   C. a catalytically effective amount of a liquid tertiary amine catalyst.

10. The binder system of claim 9 wherein the monomeric glycol has a hydroxyl functionality of from about 2.0 to about 4.0, and a viscosity of less than 100 centipoise at 25° C.

11. The binder system mix of claim 10 wherein the monomeric polyol is selected from the group consisting of ethylene glycol, diethylene glycol, triethylene glycol, 1,3-propane diol, and 1,4-butanediol, 1,2,4-butanetriol, dipropylene glycol, tripropylene glycol, and mixtures thereof.

12. The binder system of claim 11 wherein the tertiary amine catalyst is an aliphatic tertiary amine.

13. The binder system of claim 12 wherein the amount of moisture in the aggregate is less than about 0.1 weight percent based upon the total weight of the aggregate.

14. The binder system of claim 13 wherein the tertiary amine catalyst is tris(3-dimethylamino)propylamine.

* * * * *